(12) United States Patent
Butzer

(10) Patent No.: US 12,318,813 B2
(45) Date of Patent: Jun. 3, 2025

(54) APPARATUS AND METHOD FOR SORTING OBJECTS

(71) Applicant: VITRONIC Dr.-Ing. Stein Bildverarbeitungssysteme GmbH, Wiesbaden (DE)

(72) Inventor: Erich Butzer, Schotten (DE)

(73) Assignee: VITRONIC Dr.-Ing. Stein Bildverarbeitungssysteme GmbH, Wiesbaden (DE)

( * ) Notice: Subject to any disclaimer, the term of this patent is extended or adjusted under 35 U.S.C. 154(b) by 0 days.

(21) Appl. No.: 18/626,383

(22) Filed: Apr. 4, 2024

(65) Prior Publication Data
US 2024/0335859 A1 Oct. 10, 2024

(30) Foreign Application Priority Data
Apr. 4, 2023 (EP) ..................................... 23166619

(51) Int. Cl.
*B07C 3/08* (2006.01)
(52) U.S. Cl.
CPC ..................................... *B07C 3/08* (2013.01)
(58) Field of Classification Search
CPC ..................................................... B07C 3/08
See application file for complete search history.

(56) References Cited

U.S. PATENT DOCUMENTS

| 8,096,402 B2 | 1/2012 | Chastain | |
| 2021/0362194 A1* | 11/2021 | Lundahl | B07C 3/14 |
| 2022/0168780 A1* | 6/2022 | Yang | B07C 3/08 |
| 2022/0297160 A1* | 9/2022 | Costanzo | B65G 47/53 |
| 2024/0262626 A1* | 8/2024 | Langenbach | B25J 9/0093 |

FOREIGN PATENT DOCUMENTS

| DE | 102006025601 B3 | 9/2007 |
| EP | 3978149 A1 | 4/2022 |

OTHER PUBLICATIONS

European Search Report issued in corresponding EP Application 23166619.9, issued Jul. 25, 2023, 6 pages.

* cited by examiner

*Primary Examiner* — Jacob S. Scott
*Assistant Examiner* — Miraj T. Patel
(74) *Attorney, Agent, or Firm* — Burris Law, PLLC

(57) ABSTRACT

An apparatus for sorting objects includes a feeding device, at least one transfer device and several target containers. The feeding device is configured to convey the objects to the at least one transfer device. The transfer device is configured to transfer the objects to the target containers. The apparatus has a sorting device in which the target containers can be moved such that the target containers can be positioned either at a transfer position assigned to the at least one transfer device or at any one of a plurality of waiting positions. The waiting positions form an at least two-dimensional position grid.

14 Claims, 6 Drawing Sheets

APPARATUS AND METHOD FOR SORTING OBJECTS

CROSS-REFERENCE TO RELATED APPLICATIONS

This application claims priority to and the benefit of EP 23166619.9 filed on Apr. 4, 2023. The disclosure of the above application is incorporated herein by reference.

FIELD

The present disclosure relates to an apparatus and a method for sorting objects, and more particularly to an apparatus and a method for transferring objects from a feeding device to a plurality of containers.

BACKGROUND

The statements in this section merely provide background information related to the present disclosure and may not constitute prior art.

A sorting system for flat mail items is described in DE 10 2006 025 601 B3. Pocket-shaped containers arranged one behind the other rotate relative to a large number of intermediate trays. The containers, whose bottoms can be opened in a controlled manner, contain flat objects to be sorted in an upright position. The intermediate trays are arranged one behind the other below the container track. The objects can therefore be transferred from the pocket-shaped containers to the intermediate trays as they fall. Target holders below the fixed intermediate trays are also moved relative to the intermediate trays. The transfer of objects from the intermediate trays to the target holders is identical to the transfer of objects from the containers to the intermediate trays.

U.S. Pat. No. 8,096,402 B2 describes another sorting system in which items are moved on a conveyor belt and then sorted into containers. The containers can occupy two positions. The containers are loaded with the items in one position. If the containers are no longer filled, they can be moved to a retrieval zone. The filled containers can also be transported on another conveyor belt for further transportation.

SUMMARY

This section provides a general summary of the disclosure and is not a comprehensive disclosure of its full scope or all of its features.

According to one aspect an apparatus for sorting objects comprises a feeding device, at least one transfer device and a plurality of target containers, wherein the feeding device is arranged to convey the objects to the at least one transfer device, and wherein the transfer device is arranged to transfer the objects to the target container. The apparatus has a sorting device, in which the target containers can be moved such that the target containers can be positioned either at a transfer position assigned to the at least one transfer device or at any one of a plurality of waiting positions, wherein the waiting positions form an at least two-dimensional position grid.

This apparatus enables the objects to be sorted quickly, as the target containers move towards the objects in sequence depending on the order in which they are fed by the feeding device. After an object has been transferred to the corresponding target container, it usually moves back to its starting position or to another waiting position, thus freeing up the transfer position for other target containers. In the event that another object is to be transferred to the same target container at the same transfer position, the target container can remain in the assigned transfer position.

This means that more target containers can be loaded with objects than there are transfer devices available. The sorting device also saves space, as the target containers are transferred from waiting positions in a two- or three-dimensional position grid.

To convey the objects, the feeding device can comprise a conveyor belt or a roller conveyor.

The feeding device may comprise at least one pusher which is arranged to convey the objects to the at least one transfer device. It is also conceivable that the pushers themselves represent the transfer device. In this case, the pushers push the objects directly from the feeding device into the target containers. It is also conceivable that the feeding device has conveying and deflecting devices with which the objects can be transported along a main conveying direction on the one hand and can be deflected from the main conveying direction for transfer to the target containers on the other. Depending on the type, the target containers can be filled from above or from the side.

The feeding device can be designed as a linear conveyor belt or a linear roller conveyor. However, the feeding device can also be designed as a tray sorter or a circulating circular conveyor belt. With a circular conveyor belt, the objects are permanently transported in a circle on the feeding device. Below the feeding device, the target containers are moved on the sorting device to sort the objects. If an object is above the correct target container, for example, a flap opens and the object falls into the target container due to gravity. The flap then closes again so that a new object can be picked up.

The at least one transfer device may comprise a pusher, a conveyor belt, a roller conveyor, a flap or a slide, which may be hinged, to transfer an object to a target container.

To move the target containers, the sorting device can comprise a conveying and deflecting device, for example in the form of conveyor belts, roller conveyors or cross tables, which can each move the target containers crosswise to enable the target containers to be moved in two directions at right angles to each other. It is also conceivable that the conveying and deflecting devices are designed as driverless transport vehicles for one or more target containers.

The conveying and deflecting devices enable the target containers to be moved in at least two axes, for example along an X-axis and a Y-axis of an X-Y coordinate system or a two-dimensional coordinate system. The conveying and deflecting devices can include electromechanical sliders or cross tables.

The target containers can be moved individually, i.e. independently. Alternatively, it may also be provided that the sorting device has at least one container carrier on which a plurality of the target containers are accommodated, the at least one container carrier being movable in the sorting device for moving the accommodated target containers together. This means that the target containers arranged on one of the container carriers are moved together, i.e., synchronously. Several container carriers can be provided, each of which moves a partial number of target containers together.

To move the container carriers, a cross table can be provided on which one of the container carriers is arranged. The container carrier can be moved in one plane via the cross table. The cross table can have a base element on which a first slider is arranged so as to be linearly displaceable along a first axis. A second slider is arranged on the first slider so as to be linearly displaceable along a second axis, the first axis and the second axis being arranged transversely to one another, in particular at right angles to one another. The container carrier is attached to the second slider so that it can be moved in a plane spanned by the first axis and the second axis.

The position grid can be arranged at least partially below the feeding device and/or below the transfer device in order to ensure the most space-saving arrangement possible. This allows the target containers to move freely, especially in the arrangement with container carriers described above.

The device can also have a dispensing device for further transportation of the target containers, with which the target containers are transported to a dispensing station at which the target containers are packaged for shipping, for example.

Similar to the feeding device, the dispensing device can comprise a conveyor belt or a roller conveyor for conveying the objects.

The device can also have at least one gantry arm with gripper, which is configured to move target containers from the sorting device to the dispensing device and/or to insert empty target containers into the sorting device.

The gantry arm can be part of an area gantry above the feeding device, at a higher level. The gripper of the gantry arm (robot arm) can grip target containers and place them, for example, on a conveyor belt of the dispensing device for removal when the target containers have been filled. Furthermore, the target containers can be exchanged with the gantry arm so that filled target containers can be replaced with empty target containers.

The gantry arm can be designed with rotatable double grippers and/or be rotatable itself, so that the target containers can be exchanged directly during one approach. When a target container is filled, the first gripper of the double gripper grips the filled target container. The double gripper then rotates (for example by 180°) to place an empty target container, which is held by a second gripper on another side of the gantry arm, in the previous position of the filled target container. The gantry arm can be moved along rails suspended above the sorting device.

According to another aspect a method for sorting objects is provided with the following method steps: conveying an object to a transfer device by means of a feeding device, moving a target container to a transfer position assigned to the transfer device, transferring the object from the transfer device to the target container by means of the transfer device and moving the target container to a waiting position of an at least two-dimensional position grid of waiting positions and, if necessary, additionally from the transfer positions, to a further transfer position or leaving the target container at the assigned transfer position to receive a further object.

The target containers can therefore be transported, for example, by means of the conveying and deflecting devices of the sorting device described above. They are first transported to their corresponding destination, to an object in the transfer device. Once the object has been successfully transferred to the target container, the target container is either transported to its starting point or to another waiting position. Alternatively, the target container can also be transported to another transfer position or remain at the assigned transfer position to receive another object.

First, an identification feature of the object can be identified or recognized. The object is then assigned to a specific target container based on the identification feature. The object can then be conveyed to any object-free transfer device by means of the feeding device. At the same time, the specific target container can be moved to the transfer position assigned to the object-free transfer device, so that the object can then be transferred to the target container at this transfer position by means of the transfer device.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
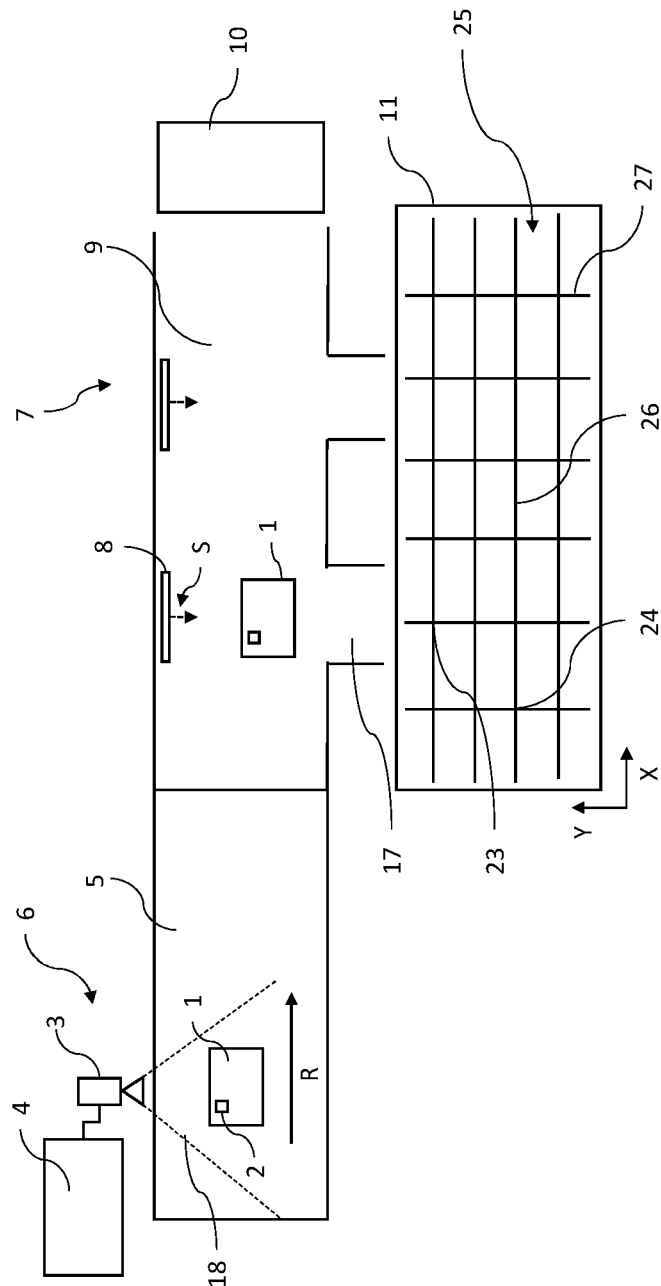
FIG. 1 is a schematic top view of a first embodiment of an apparatus for sorting objects.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
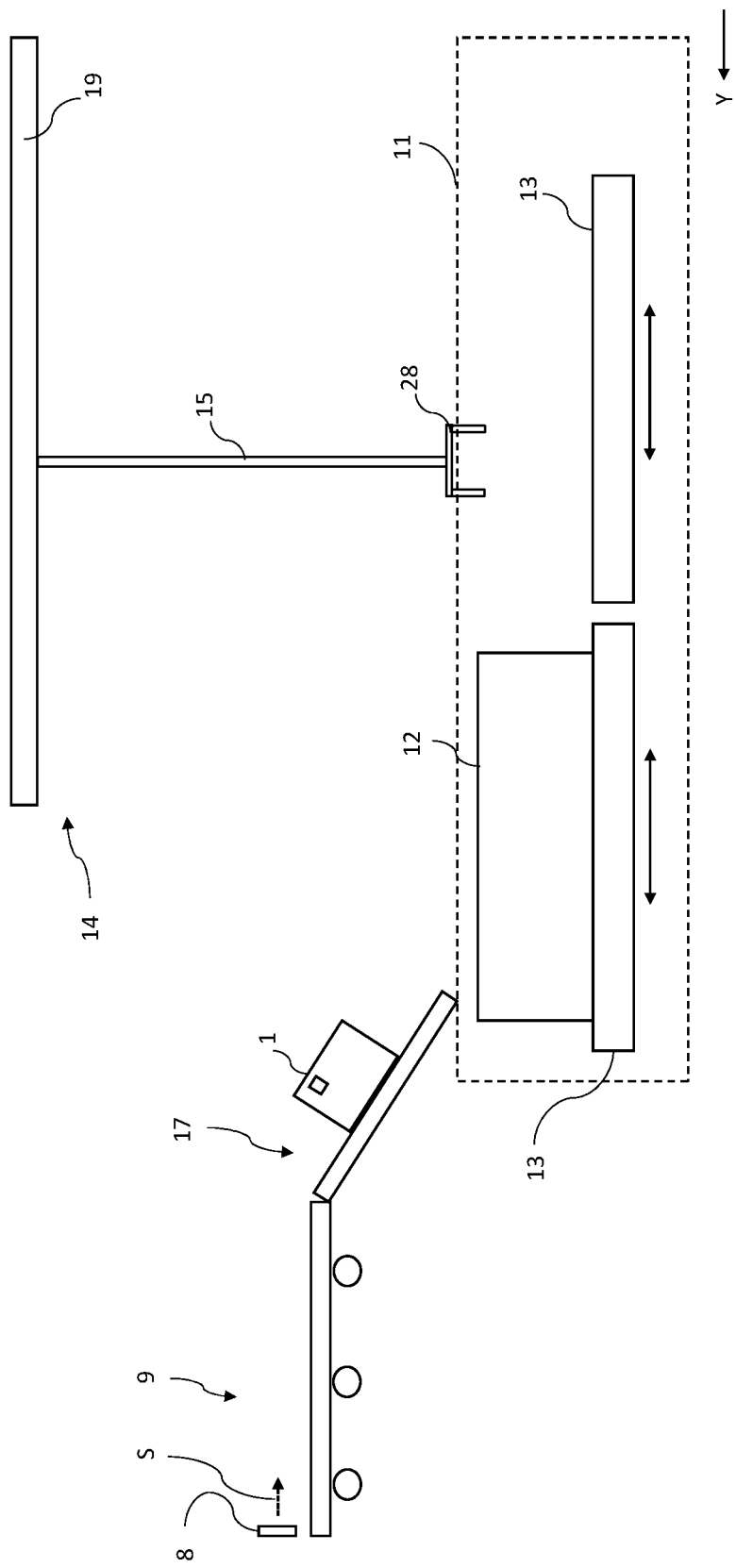
FIG. 2 is a schematic side view of the apparatus shown in FIG. 1.

FIGS. 1 and 2 schematically show a sorting system 7 for sorting objects 1 in different views. Objects 1 can be parcels for shipping goods, for example. The sorting system 7 comprises a feeding device with a conveyor belt 5, an adjoining outfeed conveyor belt 9 and two pushers 8. Furthermore, the sorting system 7 has two transfer devices in the form of slides 17.

The feeding device is designed in such a way that the objects 1 can be conveyed to the transfer devices in the form of slides 17. The pushers 8, each of which is assigned to one of the slides 17, are used for this purpose. The objects 1 are first moved by the conveyor belt 5 and the outfeed conveyor belt 9 in a main transportation direction R. The slides 17 are located to the side of the outfeed conveyor belt 9 with respect to the main transportation direction R. The slides 17 are also arranged one behind the other in relation to the main transportation direction R. The pushers 8 are each arranged on an opposite side of the outfeed conveyor belt 9. As soon as an object 1 has reached a slide 17 onto which it is to be pushed, the corresponding pusher 8 extends in an ejection direction S transverse to the main transportation direction R and pushes the object 1 onto the corresponding slide 17.

From there, the object 1 slides into a target container 12, which is located at a transfer position 23 of a sorting device 11 assigned to the corresponding slide 17.

The sorting device 11 is configured such that the target container 12 can be moved either to a transfer position 23 assigned to one of the at least one slide 17 or to any one of a plurality of waiting positions 24. The transfer positions 23 and the waiting positions 24 form a two-dimensional position grid 25. It is also possible that only the waiting positions 24 form a two-dimensional position grid and the transfer positions 23 are positioned separately.

The sorting device 11 spans a plane in an XY coordinate system, which forms the position grid 25. The target containers 12 can be moved freely within this plane or within the position grid 25, respectively. To move the target containers 12, the sorting device 11 can comprise several conveying and deflecting devices 13, for example in the form of conveyor belts or roller conveyors, which can each be arranged crosswise in order to move the target containers 12 in the two directions arranged transversely to one another, along an X-axis and a Y-axis of the XY coordinate system. The conveying and deflecting devices 13 can include electromechanical sliders or cross tables. In principle, it is also conceivable that the conveying and deflecting devices 13 are driverless transport vehicles.

In one embodiment, it is possible for the target containers 12 to be movable along a certain number of first pathways 26 in the X-direction and a certain number of second pathways 27 in the Y-direction by means of drive means of the sorting device 11 not shown here. The crossing points of the first pathways 26 and the second pathways 27 each form one of the transfer positions 23 and one of the waiting positions 24, respectively.

FIG. 1 shows a scanning device 6. The objects 1 are scanned on the conveyor belt 5 by an optical sensor 3, for example a camera or a scanner, in a detection area 18 of the optical sensor 3. Here, an identification feature 2, for example an address field of the objects 1 in the form of a mail item, is recognized or identified by means of a processing unit 4.

Furthermore, the processing unit 4 controls the target containers 12 or the conveying and deflecting devices 13 of the sorting device 11 for moving the target containers 12. The processing unit 4 assigns a suitable target container 12 to each scanned object 1 depending on the identification feature 2. A free transfer position 23 at a transfer device (slide 17), which is free of an object 1, is then determined for the selected target container 12. The selected target container 12 is then moved to the free transfer position 23 by means of the conveying and deflecting devices 13 of the sorting device 11. Ideally, the selected target container 12 reaches the free transfer position 23 before the object 1 reaches the transfer device (slide 17) of the free transfer position 23. The corresponding pusher 8 is then actuated to transfer the object 1 via the slide 17 into the selected target container 12.

In order to enable intermediate storage of objects 1, in particular in the event that the object 1 reaches the object-free transfer device (slide 17) before the selected target container 12 reaches the free transfer position 23, the transfer device can be designed as an intermediate storage device. For example, the slide 17 can be designed to be pivotable so that an object 1 can be temporarily stored on it in a pivoted-up position. Once the selected target container 12 reaches this pivotable slide 17, it can be transferred to a pivoted-down position so that the object 1 slides down the slide 17 into the selected target container 12. Instead of a pivotable slide, a conveyor belt or a roller conveyor can also be provided, which are only actuated when the selected target container 12 has reached the transfer device.

The conveying and deflecting devices 13 of the sorting device 11 can comprise electromechanical cross tables which can move the target containers 12 in two spatial directions, in the direction of the X-axis and in the direction of the Y-axis, in one plane, the target containers 12 being transported from one conveying and deflecting device 13 to the next conveying and deflecting device 13. In principle, the conveying and deflecting devices 13 can also be configured such that they move several target containers 12 simultaneously and synchronously with one another.

As soon as the object 1 has been transferred to the selected target container 12, the latter is transported to its starting point or to another waiting position 24 within the position grid 25 of the sorting device 11. Alternatively, the target container 12 can also be transported to another transfer position or remain at the assigned transfer position to receive another object 1.

In the event that an object 1 cannot be identified via the identification feature 2, for example, a residual container 10 is available at the end of the outfeed conveyor belt 9, into which the object 1 is transferred.

FIG. 2 shows a side view of the sorting system 7. It can be seen that the sorting system 7 of the design example shown operates in several vertically stacked levels. The conveying and deflecting devices 13, on which the target containers 12 are arranged, are located at a lower level. The conveyor belt (not shown here) and the outfeed conveyor belt 9 with the slide 17 are located on a middle level. An area gantry 14 is arranged in the upper level, which is equipped with several rails 19. Along the rails 19, a dispensing device 16 with a gripper 28 arranged on a gantry arm 15 can be moved suspended along the X-axis and the Y-axis. The gripper 28 can be moved along a vertical Z-axis and pivot around it.

Once a target container 12 is filled, the gantry arm 15 is moved to the waiting position 24 of the filled target container 12. The filled target container 12 is gripped by the gripper 28 and conveyed by means of the gantry arm 15, for example to a conveyor belt (target conveyor belt) not shown here for further transportation. Once a target container 12 has been transported to the target conveyor belt, an empty target container 12 is placed on an empty waiting position 24 on a conveying and deflecting device 13 of the sorting device 11 by means of the gantry arm 15.

Figure 3:
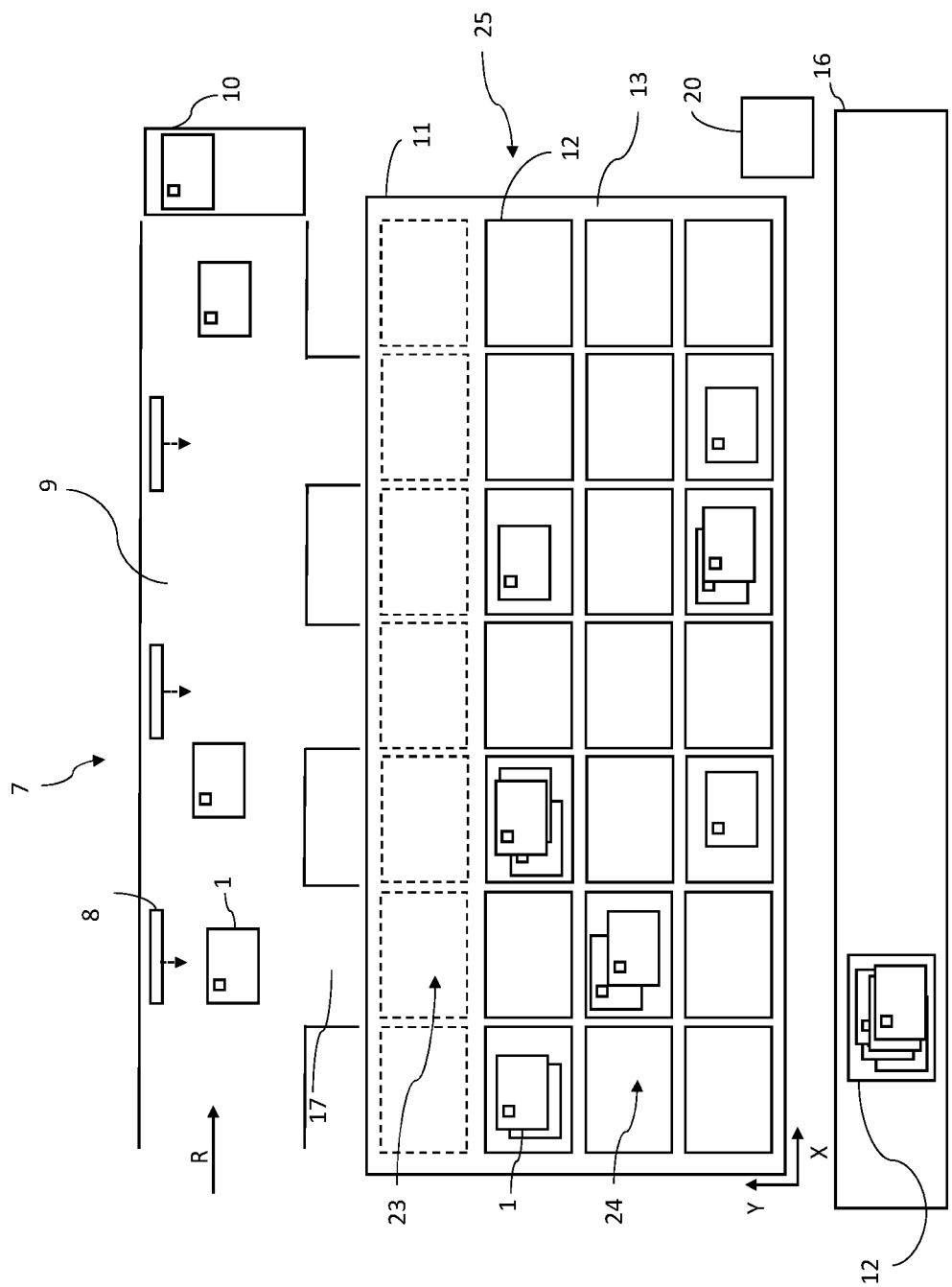
FIG. 3 is a schematic top view of a second embodiment of an apparatus for sorting objects.

FIG. 3 shows a second embodiment of a sorting system 7, wherein details which correspond to details of the first embodiment according to FIGS. 1 and 2 are provided with the same reference signs and are described there.

The conveying and deflecting devices 13 are arranged in several rows parallel to the main transportation direction R in such a way that they form a two-dimensional position grid 25 consisting of individual waiting positions 24. The target containers 12 are each located on one of the conveying and deflecting devices 13. The target containers 12 can each be conveyed parallel to the main transportation direction R to an adjacent conveying and deflecting device 13 of the same row or moved transversely to the main transportation direction R to an adjacent conveying and deflecting device 13 of an adjacent row. The number of conveying and deflecting devices 13 and target containers 12 is arbitrary.

As soon as a target container 12 is completely filled, it is conveyed by the gantry arm 15 onto a conveyor belt 16 of a dispensing device, as described above. Here, the final destination of the target container 12 may be printed by means of a printer 20 on a paper strip that is adhered to the target container 12.

Figure 4:
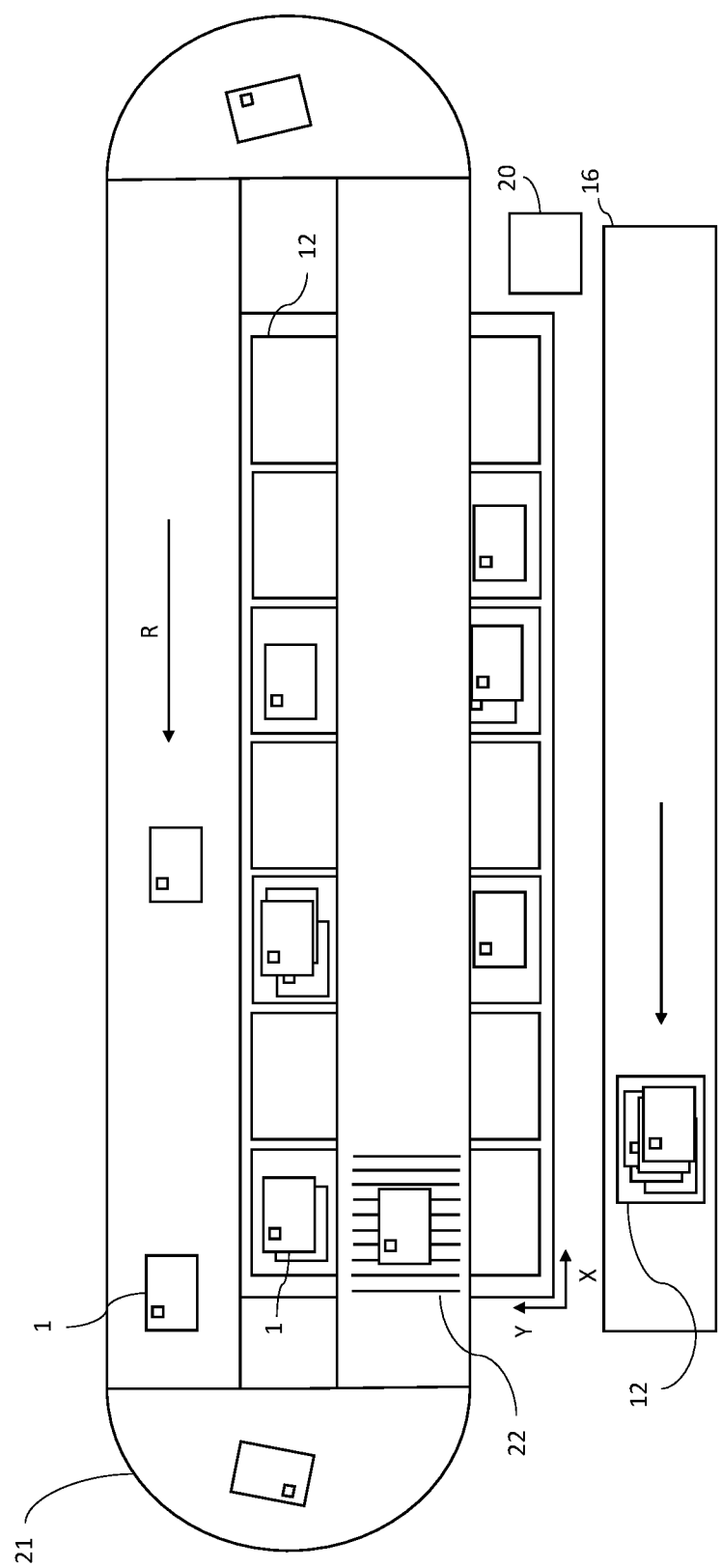
FIG. 4 is a schematic top view of a third embodiment of an apparatus for sorting objects.

FIG. 4 shows a third embodiment of a sorting system 7, wherein details which correspond to details of the first or second embodiment are provided with the same reference signs and are described there.

The sorting system 7 of the third embodiment comprises a feeding device with a circular conveyor belt 21. The target containers 12 are conveyed in a circle on the circular conveyor belt 21 until a target container 12 has been transported on a conveying and deflecting device 13 of a transfer position 23 below the circular conveyor belt 21. In this case, a flap 22, which is part of the transfer device, opens in an area of the transfer position 23 of the circular conveyor belt 21, so that the object 1 falls into the target container 12 due to gravity.

The conveying and deflecting devices 13 each serve to move a target container 12 arranged on one of the conveying and deflecting devices 13 in the direction of a first axis (X-axis) and/or a second axis (Y-axis). This makes it possible to convey the target container 12 from one conveying and deflecting device 13 to an adjacent conveying and deflecting device 13.

For example, it is conceivable that the conveying and deflecting device 13 has rollers mounted to rotate about a horizontal axis, at least some of which are driven. The rollers are mounted in a frame of the conveying and deflecting device 13 so as to pivot about a vertical axis perpendicular to the first axis (X-axis) and to the second axis (Y-axis) and are coupled to a pivot drive. The rollers can thus be adjusted between a first position, in which the target container 12 is conveyed along the first axis (X-axis), and a second position, in which the target container 13 is conveyed in the direction of the second axis (Y-axis).

It is also conceivable that the conveying and deflecting devices 13 each have rollers, at least some of which are driven and are aligned in a first axis (X-axis) for conveying the target container 12. Furthermore, the conveying and deflecting devices 13 can each have conveying elements that can be raised and lowered, for example in the form of chain or belt conveyors. In a lowered position of the conveyor elements, the target container 12 stands on the rollers and can be moved in the direction of the first axis. In a raised position of the conveyor elements, the target container 12 stands on the conveyor elements and can be moved in the direction of the second axis.

Figure 5:
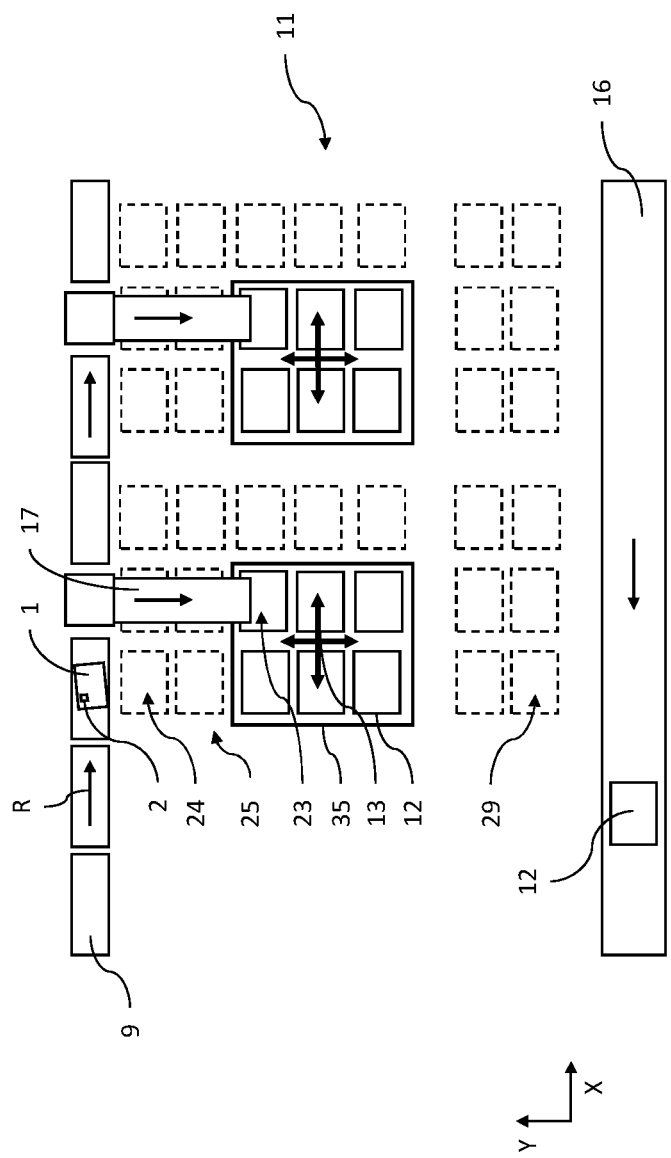
FIG. 5 is a schematic top view of a fourth embodiment of an apparatus for sorting objects.

FIG. 5 shows a fourth embodiment of a sorting system 7, wherein details which correspond to details of the first three embodiments are provided with the same reference signs and are described there.

The objects 1 are moved along the main transportation direction R by means of the outfeed conveyor belt 9. The outfeed conveyor belt 9 is divided into individual segments. There are transfer devices in the form of slides 17 or conveyor belts at two points on the outfeed conveyor belt 9. Two transfer devices are shown, although in principle more or fewer can be provided.

Below the outfeed conveyor belt 9 and the transfer devices 17, there is one conveying and deflecting device 13 per transfer device in the form of a cross table described later. The conveying and deflecting devices 13 each comprise a container carrier 35 on which six target containers 12 are arranged. In principle, any number of target containers 12 can be arranged on the container carrier 35. The container carrier 35 can be moved in the X-direction and in the Y-direction in one plane by means of the conveying and deflecting device 13. Here, the target containers 12 can occupy the positions indicated by the dashed lines. The container carrier 35 has two columns each extending in the Y-direction, each column containing three target containers 12 in the Y-direction. The two columns are arranged next to each other in the X direction. In the position of the container carrier 35 shown, it can be moved to the right by a further column in the direction of the X-axis. In addition, the container carrier 35 can be moved upwards by two rows in the direction of the Y-axis. Thus, each target container 12 can occupy a position grid of three positions in the Y direction and two positions in the X direction. In the present example, the middle position is the transfer position 23, in which the objects 1 can be transferred to the target container 12 located at the transfer position 23. Each of the other target containers 12 can also be moved to this transfer position 23.

In addition, reserve positions 29 are provided to which the target containers 12 can be moved from the container carrier 35 and vice versa by means of an area gantry 14 as shown in FIG. 2. Thus, in the embodiment shown, with a total of twelve target containers 12 on container carriers 35, it is possible to sort objects into more than twelve target containers 12. For this purpose, a target container 12 may have to be conveyed from the container carrier 35 to one of the reserve positions 29 and replaced by a target container 12 in a further reserve position 29 before the object 1 can be conveyed from the transfer devices 17 into the respective target container 12.

Furthermore, the area gantry 14 is used to move completely filled target containers 12 onto the conveyor belt or dispensing device 16.

With the sorting systems shown, it is possible to sort several objects 1, which are assigned to a common destination for further transportation, into one or more target containers 12. This assignment of one or more target containers 12 can also be made dynamically depending on the frequency of input and the number of objects 1 to a common target.

Figure 6:
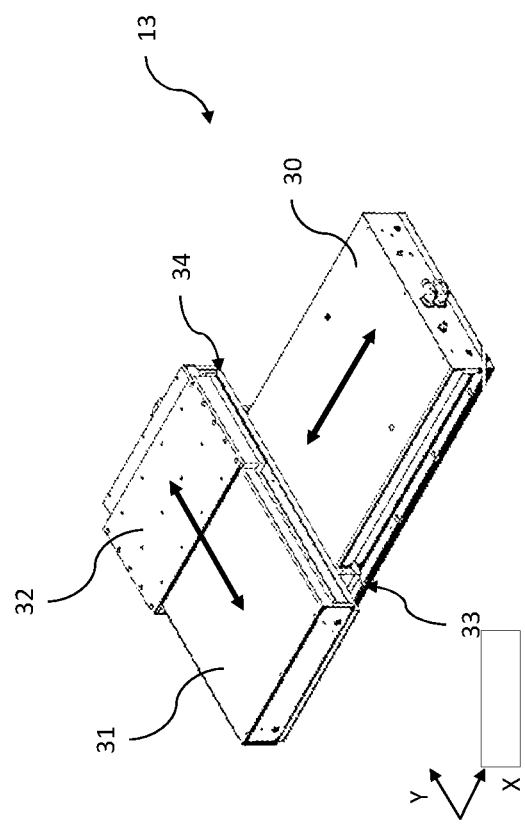
FIG. 6 is a schematic representation of a conveying and deflecting device in the form of a cross table.

FIG. 6 shows a conveying and deflecting device 13 in the form of a cross table, as can be used in the sorting device shown in FIG. 5. The cross table 13 comprises a base element 30, which can be fixed to the floor, for example. On the base element 30, a first slider 31 is linearly displaceable along the X-axis, as indicated by the corresponding arrow. On the first slider 30, in turn, a second slider 32 is linearly displaceable along the Y-axis, as indicated by the corresponding arrow. The X-axis and the Y-axis are arranged perpendicular to each other and span a horizontal plane.

The first slider 31 is guided here on the base element 30 via a first linear guide 33. The first linear guide 33 has guide elements on the first slider 31, which engage around the base element 30 and engage in guide paths of the base element 30. The second slider 32 is guided on the first slider 31 via a second linear guide 34. The second linear guide 34 also has guide elements on the second slider 32, which engage around the first slider 31 and engage in guide paths of the first slider 31.

The container carrier 35 can be arranged on the second slider 32 as shown in FIG. 5 and connected thereto, so that the container carrier 35 can be moved in the plane spanned by the X-axis and the Y-axis.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for sorting objects, comprising:
   a feeding device,
   at least one transfer device, wherein the feeding device is configured to convey the objects to the at least one transfer device,
   a plurality of target containers,
   wherein the transfer device is configured to transfer the objects to the target containers, and
   a sorting device which moves said target containers to a transfer position assigned to the at least one transfer device and to any one of a plurality of waiting positions, the waiting positions forming an at least two-dimensional position grid.

2. The apparatus according to claim 1, wherein the feeding device comprises a conveyor belt or a roller conveyor for conveying the objects.

3. The apparatus according to claim 1, wherein the feeding device comprises at least one pusher that is configured to convey the objects to the at least one transfer device.

4. The apparatus according to claim 1, wherein the at least one transfer device comprises a pusher, a conveyor belt, a roller conveyor, a flap or a slide.

5. The apparatus according to claim 1, wherein the sorting device for moving the target containers comprises conveying and deflecting devices in the form of conveyor belts, roller conveyors, cross tables or driverless transport vehicles.

6. The apparatus according to claim 1, wherein the sorting device has at least one container carrier on which a plurality of the target containers is accommodated, and the at least one container carrier is movable in the sorting device for moving the accommodated target containers together.

7. The apparatus according to claim 1, wherein the sorting device has at least one cross table on which a container carrier is arranged that can be moved in a plane by means of the cross table.

8. The apparatus according to claim 1, wherein the at least two-dimensional positioning grid is arranged at least partially below the feeding device and/or below the transfer device.

9. The apparatus according to claim 1, wherein the apparatus has a dispensing device for further transportation of the target containers.

10. The apparatus according to claim 9, wherein the dispensing device comprises a conveyor belt or a roller conveyor for conveying the objects.

11. The apparatus according to claim 10, wherein the apparatus has at least one gantry arm with gripper, which is configured to move target containers from the sorting device to the dispensing device and/or to insert empty target containers into the sorting device.

12. A method for sorting objects, the method comprising:
   conveying an object to a transfer device by means of a feeding device;
   moving a target container to a transfer position assigned to the transfer device;
   transferring the object from the transfer device into the target container by means of the transfer device; and
   moving the target container to a waiting position of an at least two-dimensional position grid formed by a plurality of waiting positions, to another transfer position or leaving the target container at the assigned transfer position to receive a further object.

13. The method according to claim 12, further comprising:
   identifying an identification feature of the object;
   assigning the object to a specific target container using the identification feature;
   conveying the object to an object-free transfer device by means of the feeding device; and
   moving the specific target container to the transfer position assigned to the object-free transfer device.

14. An apparatus for sorting objects comprising:
   a plurality of target containers;
   a plurality of transfer devices that are configured to convey the objects to any target container of said plurality of target containers;
   a feeding device that is configured to convey the objects to any transfer device of said plurality of transfer devices; and
   a sorting device that is configured to convey said target containers to any one of a plurality of transfer positions, each transfer position being assigned to one specific transfer device of said plurality of transfer devices, and to any one of a plurality of waiting positions,
   wherein all waiting positions form a two-dimensional or a three-dimensional position grid.

* * * * *